Sept. 2, 1941.　　　W. M. ZAIKOWSKY　　　2,254,340
VALVE
Filed March 30, 1936　　　8 Sheets-Sheet 1

INVENTOR
Wladimir M. Zaikowsky
BY John Flam
ATTORNEY

Sept. 2, 1941.  W. M. ZAIKOWSKY  2,254,340
VALVE
Filed March 30, 1936  8 Sheets-Sheet 2
FIG. 1-A
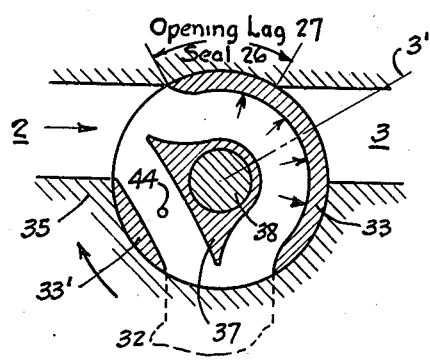
FIG. 2-A
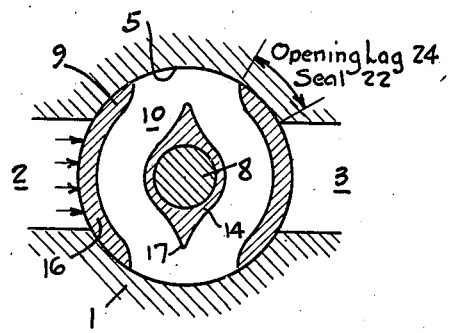
FIG. 13-B
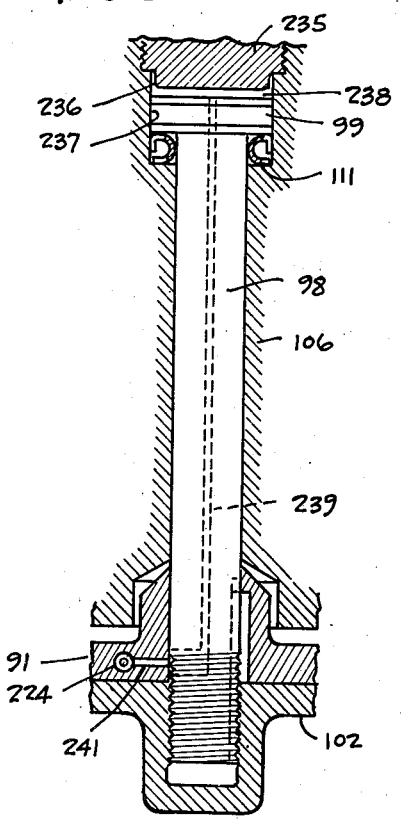
FIG. 13-A
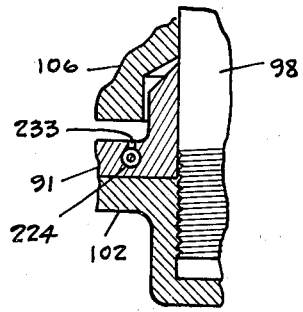
INVENTOR
Wladimir M. Zaikowsky
BY John Flam
ATTORNEY Sept. 2, 1941.    W. M. ZAIKOWSKY    2,254,340
VALVE
Filed March 30, 1936    8 Sheets-Sheet 4
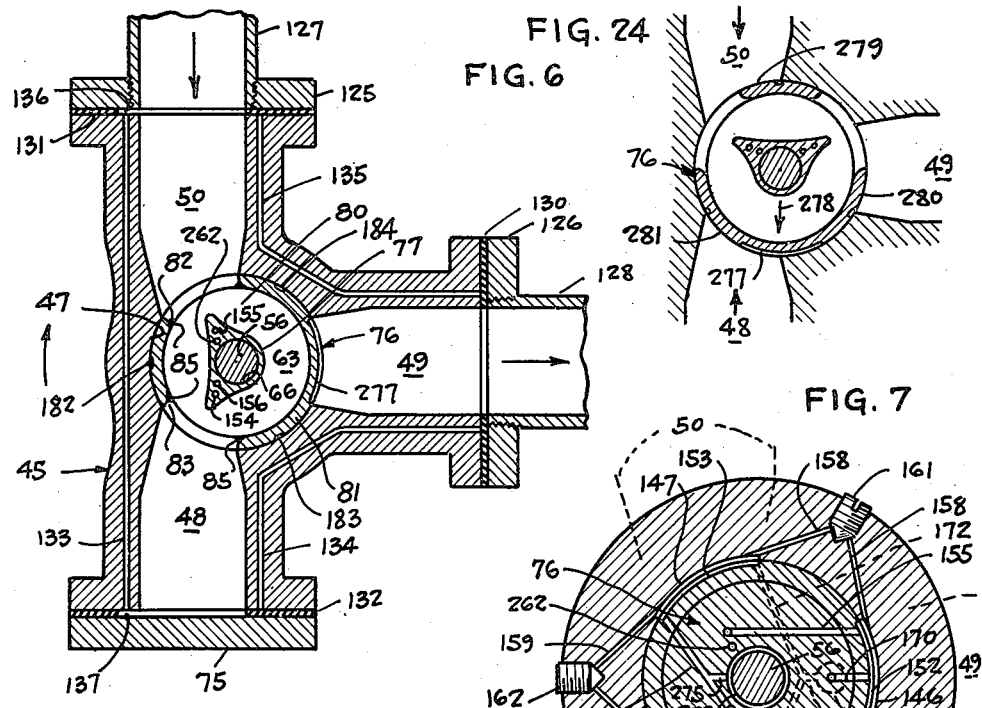
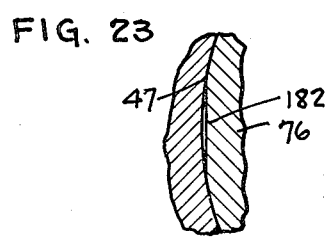
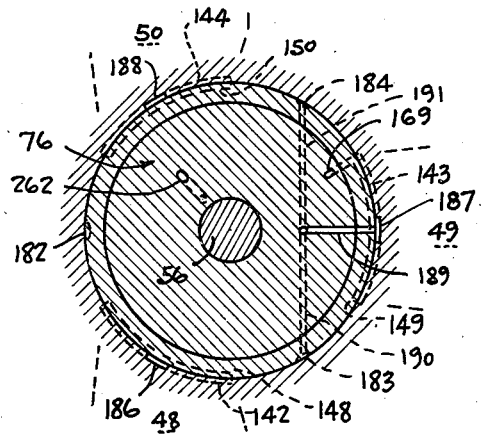
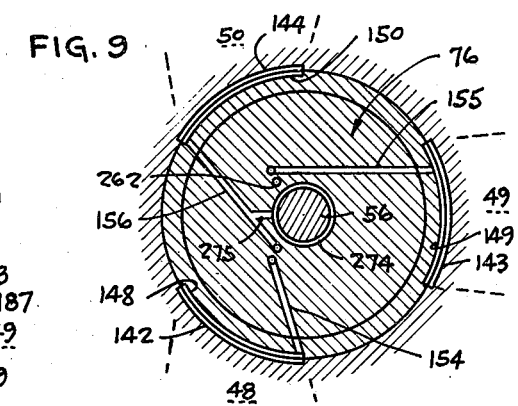
INVENTOR
Wladimir M. Zaikowsky
BY John Flam
ATTORNEY Sept. 2, 1941.   W. M. ZAIKOWSKY   2,254,340
VALVE
Filed March 30, 1936   8 Sheets-Sheet 5

INVENTOR
Wladimir M. Zaikowsky
BY John Flam
ATTORNEY

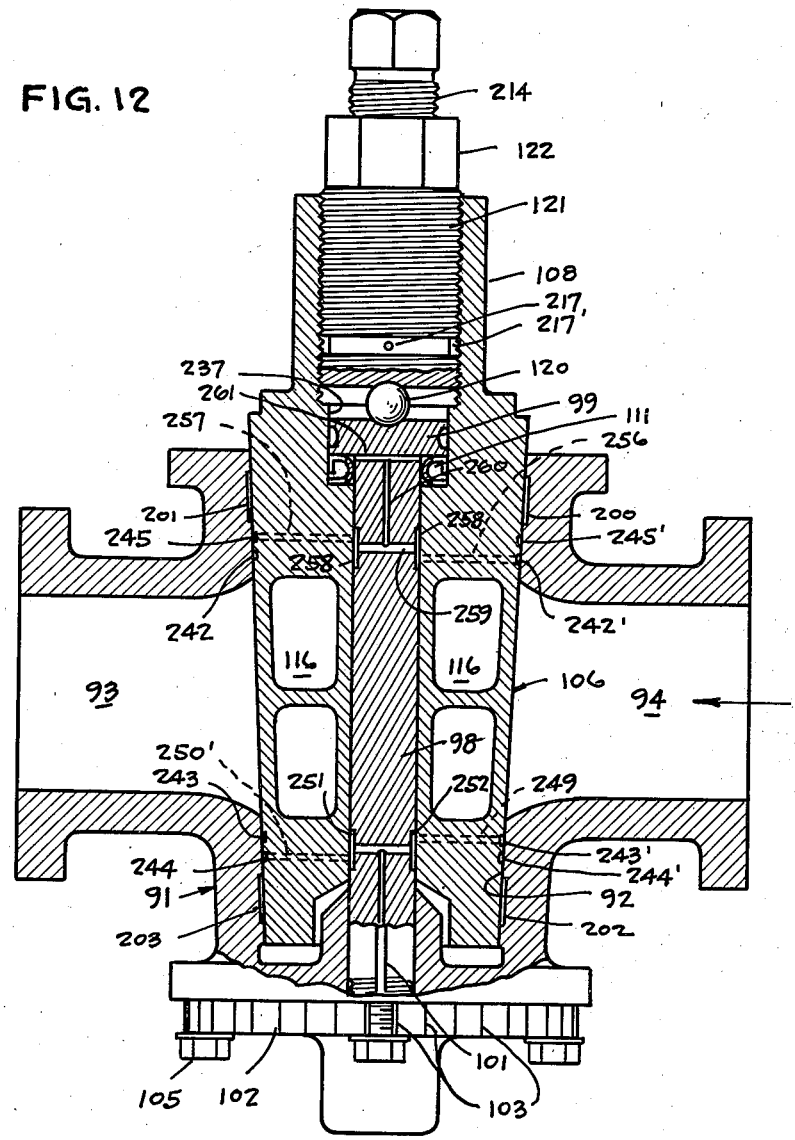

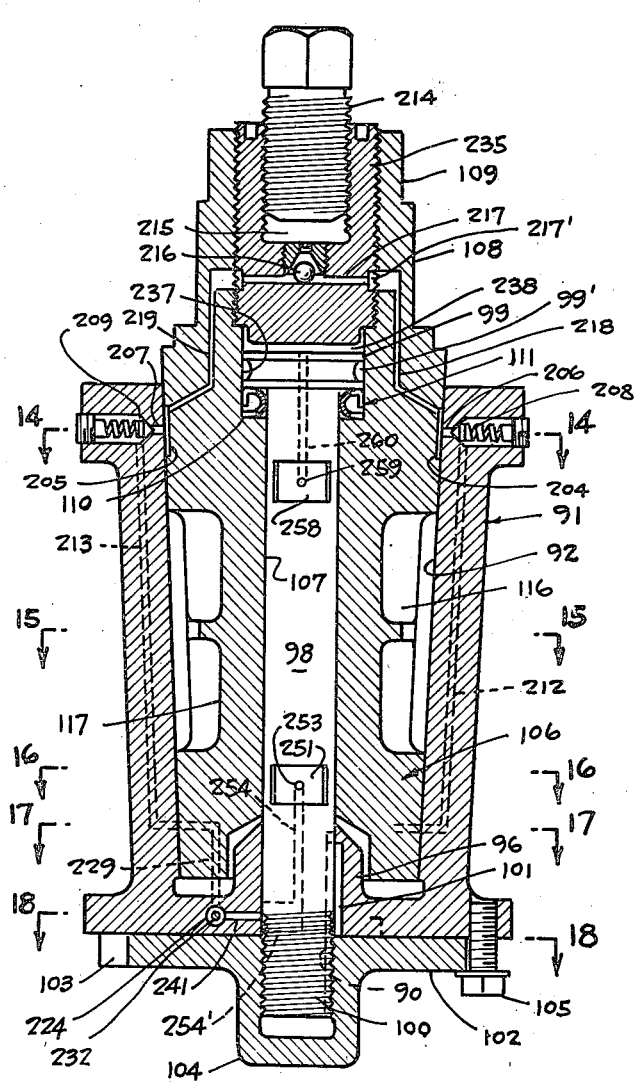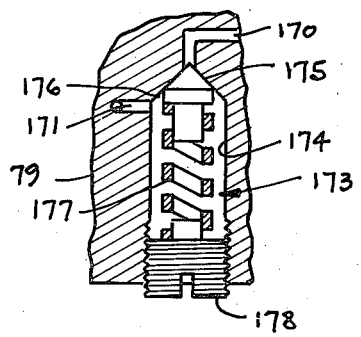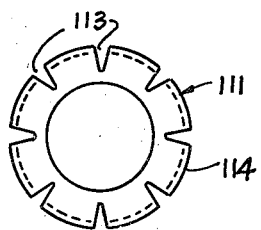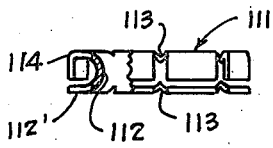

Sept. 2, 1941.     W. M. ZAIKOWSKY     2,254,340
VALVE
Filed March 30, 1936     8 Sheets-Sheet 8
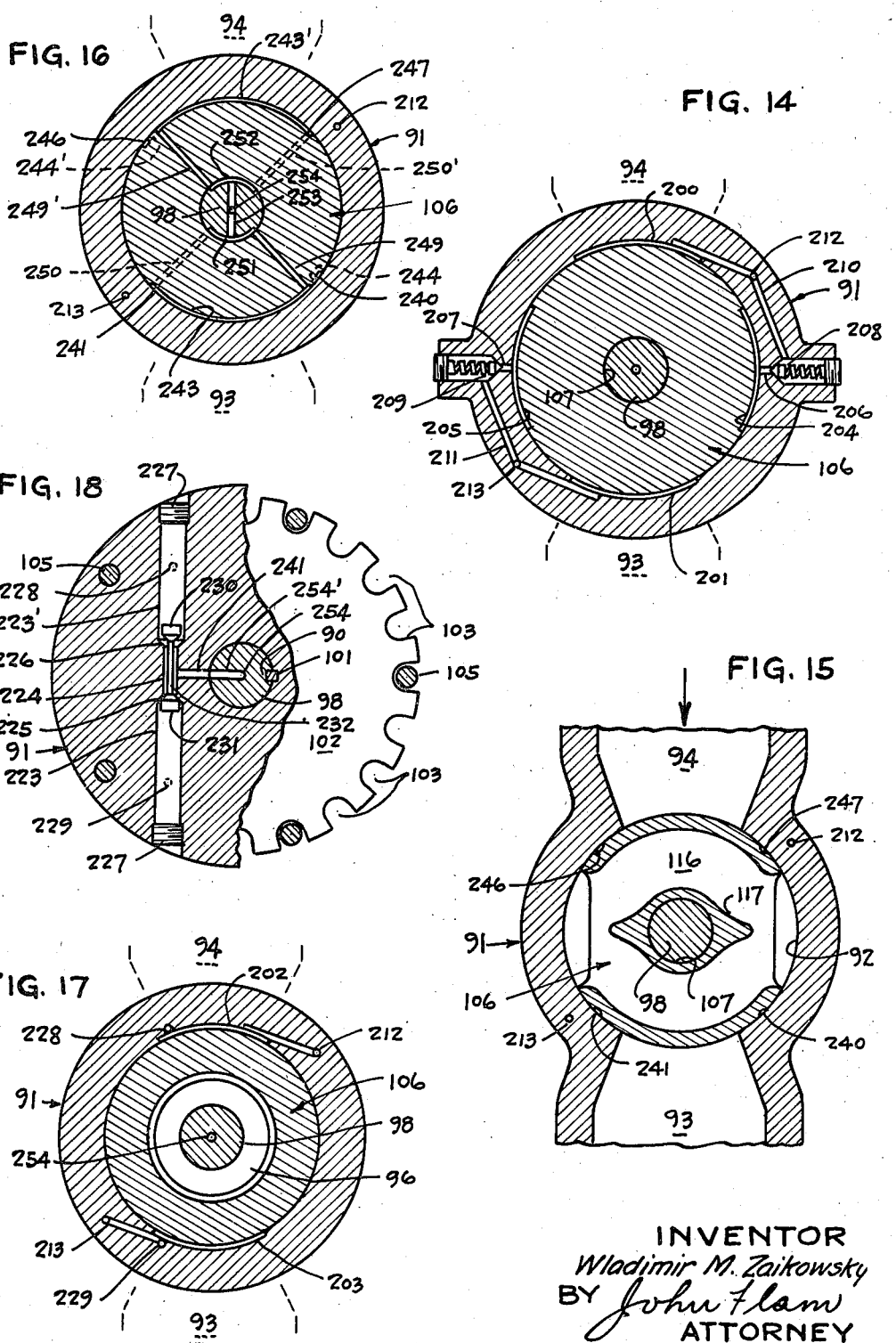

Patented Sept. 2, 1941

2,254,340

UNITED STATES PATENT OFFICE 2,254,340

VALVE

Wladimir M. Zaikowsky, Los Angeles, Calif., assignor of twenty-five per cent to Samuel S. Mackeown, Pasadena, Calif.

Application March 30, 1936, Serial No. 71,664

41 Claims. (Cl. 251—93)

This invention relates to valves for controlling the flow of fluids or liquids, and more particularly to valves provided with a plug rotatable through an angle for causing passages or ports in the valve body and in the plug optionally to be in registry or out of registry.

Such valves in general are old and well-known. For low pressure operation, and for low discharge rates through the valves, no serious difficulty arises in the operation of such valves. The plug is usually tapered and accurately finished to fit into a correspondingly tapered seat in the valve body; and the contiguous tapered surfaces commonly have been used not only for sealing purposes but also as guiding surfaces for the plug rotation.

However, as the fluid pressure or the valve size, or both increase, serious design problems arise in connection with valves of this character that are to be found in the prior art. The resistance to opening of the valve increases faster than might be expected. It has not been uncommon to provide very expensive gearing or reduction mechanism to make it possible to rotate the plug as required. The reasons for such increase of the resistance to operation are not completely understood, and consequently the valve designer, encountering such problems, has been led to bulky and expensive modes of applying adequate torque to the plug. Often the increase in mechanical force for the valve rotation (for example by worm and wheel transmission, reduction gearing, motor drive, or combinations thereof), has been supplemented by expensive or complicated devices for lubricating the valve surfaces or for freeing a "frozen" plug, or for performing both these functions.

These design problems encountered and only awkwardly and partially taken into account by valves heretofore constructed or suggested, have been effectively and inexpensively solved by the present invention.

Resistance to plug rotation is materially reduced by the aid of the present invention. One serious cause of great resistance in prior devices is that the plug does not remain truly coaxial in its seat at all times, thus making tipping or cocking of the plug possible. This misalinement of the plug in its seat leads to a concentration of contact at localized points on the plug periphery, and non-uniform clearance between the plug and the seat. Uneven wear, with its attendant evils, follows as a necessary consequence.

It is one of the objects of this invention to provide for essentially accurate alinement, substantially at all times, of the plug in its seat, and thus ensure uniformity of clearance. This is accomplished by the aid of a sturdy center post, rigidly supported by the valve body, upon which the closing member or plug is rotatable and, optionally, axially movable as well.

Another cause for increasing the resistance to movement of the plug is the existence of pressure of the fluid, tending to urge the plug in a direction perpendicular to its axis. This lack of fluid pressure balance is usually most pronounced when the valve is closed, the inlet fluid pressure having a resultant such as to urge the plug toward the seat around the outlet port. This unbalancing is compensated for or substantially neutralized by this invention; particularly by fluid pressure operating on the plug or closing member in the proper direction to secure substantial side balance.

As a result of maintaining alinement of the plug as well as sidewise balance, it is entirely feasible, with the aid of this invention, to maintain the plug or closing member in a definite and fixed adjustment adequate for satisfactory seal and easy operation of the valve. Of course, a sealing and lubricating material, such as any proper grease or substance, is utilized to fill the residual annular clearance space, if any.

Sealing and lubricating compounds have been used heretofore in grooves located either in the plug or in its seat, or in both, but difficulty has been experienced in forcing the compound from the grooves into the spaces where line fluid pressure is apt to form contact between plug and body seat. By the aid of the present invention, the spread of the sealing and lubricating material produces complete lubrication without waste of said material.

In some instances the lift of the plug from its seat has been used to facilitate its rotation and lubrication. By the aid of the present invention, it is possible to accomplish these results in a novel manner by utilizing fluid pressures that are directed to other of the foregoing purposes, such as to secure side balance.

In order to enhance the sealing effect, it is possible, by the aid of this invention, to expand the plug internally by the aid of fluid pressure, so as to urge its sealing periphery toward the seat, and yet to secure easy rotation of the closing member by counteracting the effect of line fluid pressure by external pressure of lubricant.

By the aid of the present invention it is possible to adapt a tapered closing member for utilization of line fluid pressure for holding said member in the seat throughout open and closed position, thus avoiding the necessity of a spring, and yet have easy operation of the valve.

By the aid of the present invention it is possible to construct a valve in which the members under tension can be conveniently made of forged material.

It is another object of this invention to make it possible to pass a sealing lubricant to grooves adapted to be intermediate the port openings, and yet to ensure that no pressure will be exerted in these grooves during the period when the grooves are exposed to port openings.

This invention possesses many other advantages, and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1A is a diagram similar to Fig. 1, but showing the valve in closed position;

Fig. 2A is a diagram similar to Fig. 2, but showing the valve in closed position;

Fig. 6 is a sectional view taken along plane 6—6 of Fig. 5;

Fig. 7 is a sectional view taken along plane 7—7 of Fig. 5;

Fig. 8 is a sectional view taken along plane 8—8 of Fig. 5;

Fig. 9 is a sectional view taken along plane 9—9 of Fig. 5;

Fig. 12 is a longitudinal sectional view of a modified form of the invention;

Fig. 13 is a sectional view of a further modification of the invention;

Fig. 13A is a fragmentary sectional view illustrating another form of the invention;

Fig. 13B is a fragmentary sectional view illustrating a still further form of the invention;

Fig. 14 is a sectional view taken along the plane 14—14 of Fig. 13;

Fig. 15 is a sectional view taken along the plane 15—15 of Fig. 13;

Fig. 16 is a sectional view taken along the plane 16—16 of Fig. 13;

Fig. 17 is a sectional view taken along the plane 17—17 of Fig. 13;

Fig. 18 is a sectional view taken along the plane 18—18 of Fig. 13;

Fig. 19 is a plan view of a spring washer that can be utilized in connection with several of the forms illustrated;

Fig. 20 is a side elevation, partly in section of the washer shown in Fig. 19;

Fig. 22 is an enlarged sectional view of a spring pressed valve utilized in connection with several of the forms of the invention;

Fig. 23 is an enlarged fragmentary detail section, illustrating a form of sealing groove that may be utilized in connection with some of the forms of the invention; and Fig. 24 is a diagram showing the valve of Fig. 6 in a partly open position.

Figure 1:
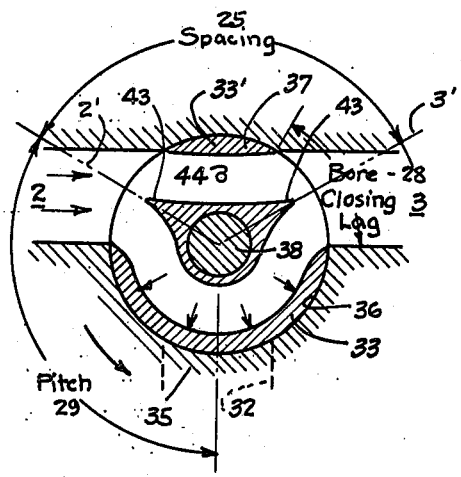
Figure 1 is a diagrammatic cross section of a valve structure, useful in explaining some of the features of the invention, the valve being shown in open position.
Figure 3:
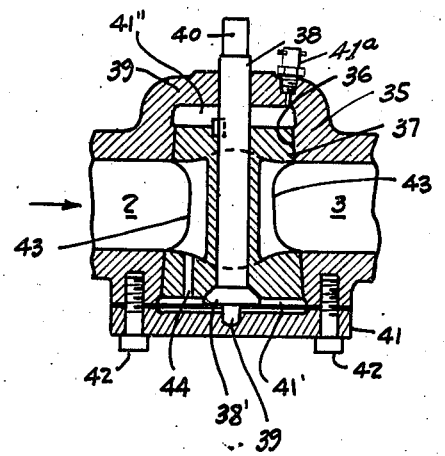
Fig. 3 is a sectional view of a valve structure constructed in accordance with the diagrams, Figs. 1 and 1A.

In the form illustrated in Figs. 1, 1A and 3, the valve body 35 is shown as having an inlet port 2 and an outlet port 3. The body 35 forms a tapered plug seat 36 for the accommodation of a rotatable plug closure member 37. This form illustrates a construction in which the line joining the centers of the ports 2 and 3 is spaced from the axis of rotation of plug 37.

Specifically, this form uses a plug closure adapted to rotate through 120° for opening or closing the valve. In other words, radial lines 2' and 3', extending from the axis of plug 37 and passing through the center of the arc corresponding to the openings 2 and 3, form an angle of 120°. This type of valve will be designated as a 120° valve. As it has certain distinct advantages over a valve structure in which the center lines of both the inlet and outlet ports pass through the axis of the rotatable plug, a more detailed description of this type of valve will now be set forth.

The plug or closing member 37 is generally of hollow construction, having two wall portions 33 and 33'. These wall portions are joined at the top and bottom of the plug to form the plug body, and the plug is keyed or splined to a rotatable shaft 38. This shaft is journalled in the wall 39 which overlies one end of the valve body 35. Shaft 38 can be provided with a flattened end 40, for accommodating a suitable handle or wrench to impart a force of rotation to the plug 37. The large end of the seat 36 can be closed by a fluid tight plate 41 secured to the body 35, as by the aid of cap screws 42. This plate 41 may also serve conveniently as a bearing support for the lower end of shaft 38.

In Figs. 1 and 1A, legends have been included to designate certain angles, corresponding to the angular motion of the plug, as well as the angular extent of the seal, and of the bores or ports. Thus in Fig. 1, the angle 25 corresponding to spacing, refers to the angular separation of the two ports 2 and 3, as measured between the radial lines 2' and 3' passing through the centers of the arcs subtended by these ports. The angle 29, corresponding to the pitch, relates to the angular motion required to be made by the plug 37, fully to open or close the valve. The angular extent 28 of each bore is designated by an appropriate legend.

In the closed position of Fig. 1A, the plug 37 is shown as having been rotated over the pitch angle in a counterclockwise direction. In this figure it is seen that the wall 33 overlaps the outlet 3 by an angle bearing the legends "Seal 26" and "Opening lag 27." The meaning of these terms can now be explained. The seal 26 is the angle of overlap of the wall 33 beyond the edge of the bore 3, serving as a "sealing" angle. It is apparent also, that on a clockwise rotation from the position of Fig. 1A, the plug 37 must first be rotated through an angle corresponding to the "Seal 26" before the valve begins to open. Therefore, the seal 26 corresponds to this opening lag. The closing lag 28, shown in Fig. 1 corresponds to the angular extent of the bore, as it is apparent that the plug 37 must be rotated in a counterclockwise direction by that angle before the outlet 3 is fully closed.

In the open position of Fig. 1, the center portion of plug 37 is so formed as to provide a bifurcated passage for the fluid. Streamlining is effected by bringing opposite sides of this central portion to a narrow edge or wing 43 opposite the centers of the inlets 2 and 3. In both open and closed position, the plug 37 being hollow, the fluid from inlet 2 exerts a pressure tending to expand the plug 37, and to urge the walls 33 and 33' against the corresponding seating surface in the valve body 35. The short radial arrows extending outwardly toward wall 33, serve to indicate this internal fluid pressure. This expansion assists in maintaining the seal.

A third opening, designated by dotted lines 32, could be placed in the valve body 35 intermediate the inlet 2 and outlet 3. In this way, the valve can be made to function as a three-way valve. If the outlet 3 is closed up, the valve can be used as a two-way angular valve.

It is apparent from the geometry of Figs. 1 and 1A that if the spacing 25 is 120°, the bores 28 corresponding to the inlets 2 and 3 must each be no greater than 120° to permit the valve to close. For three-way operation the bores must be no greater than 60°. In two-way operation, it is possible to make the bores greater than 90°; this is a considerable advantage over the usual two-way 180° type of valve. Thus with the bore 28 extending over an angle of 60°, the seal 26 is 60°, which corresponds to the angular separation between adjacent edges of the two bores. If the bores are made 90° in extent, the maximum seal possible corresponds to 120°—90°, or 30°. If a 180° spacing were used for the angle 25, and if the bores were made 90° in extent, the seal angle would be reduced to zero.

A further advantage is secured in the 120° type of valve due to the fact that the fluid in the hollow plug 37 is in open and closed positions in communication with the inlet 2. This is of considerable advantage where the valve is used for the control of liquids having a larger coefficient of thermal expansion than the material of the valve. Upon a rise of temperature after closing the valve, no liquid can be trapped inside of the plug 37, nor can undue stresses be produced upon the plug by forces due to this increased temperature. Such unusual stresses encountered with trapped liquids may force the trapped liquid between the contacting surfaces of the plug and the body and thereby affect the lubricating or sealing of the surfaces. This is especially disadvantageous if the liquid happens to be corrosive, which would react disadvantageously upon the sealing materials or surfaces.

It is noted that a chamber 41' is formed between the bottom of the plug 37 and the plate 41. This chamber can communicate, as by way of a duct 44, with the inlet 2. In this way the fluid controlled by the valve 2 can always exert a pressure on the large end of the member 37 to urge it in a seating direction, if bores are 60° or greater. Another chamber 41'' is provided at the small end of the plug 38 in which lubricant can be forced as by a lubricant fitting 41a, to provide a pressure counteracting the fluid pressure in chamber 41', to facilitate rotation. The fluid in chamber 41' is prevented from escaping by the tapered valve 38' on the shaft 38.

It is apparent from the description of this form of valve that the plug 37 is supported in axial position by the aid of the shaft 38, and its lower and upper supports 41 and 39. For medium and low pressure operation, such a support may be adequate to keep the plug 37 truly coaxial in its seat 36, in spite of the exertion of line fluid pressure thereon in transverse directions. A further consideration of this side thrust can be had in connection with Figs. 1 and 1A. In the open position of Fig. 1, the resultant of the fluid pressures exerted on the inside of the plug is directed downwardly and toward the third opening 32. This can be readily appreciated by considering the pressures or forces acting radially on the inner surfaces of walls 33 and 33'. These forces being radial with respect to the center post 38, the horizontal components cancel each other, because the walls 33 and 33' have a vertical plane of symmetry. The vertical components do not cancel, because there is no horizontal plane of symmetry; instead it can be shown that for two asymmetrical openings, placed above the center of the valve, as in Fig. 1, there is an unbalance transverse force downwards. In case the spacing equals 120°, this unbalanced transverse force is equal to the pressure acting on the area of the bore and will be designated as the plug equivalent. It exists so long as line pressure is admitted to the plug interior, and its direction corresponds to a radius drawn from the plug axis toward the center of the arc of wall 33.

In the closed position (Fig. 1A), there is accordingly an unbalanced side pressure, having a direction corresponding to the line 3' and of the same value as before. As plug 37 has moved (in a counterclockwise direction) through an angle of 120°, the unbalance due to the plug equivalent has also moved through an angle of 120°.

Figure 2:
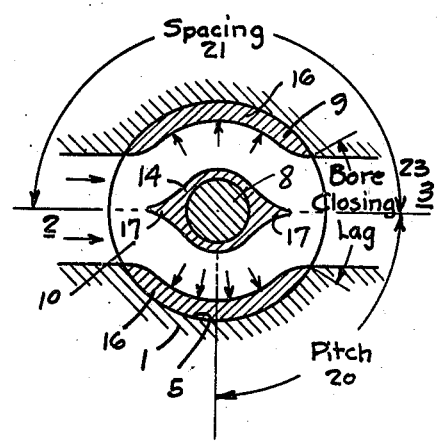
Fig. 2 is a diagrammatic cross section similar to Fig. 1, but of a different form of the valve structure, the valve being shown in open position.
Figure 4:
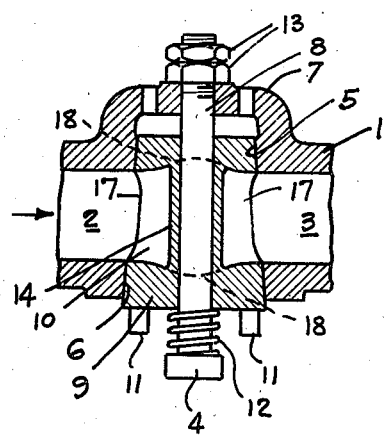
Fig. 4 is a sectional view of a valve structure constructed in accordance with the diagrams, Figs. 2 and 2A.

The advantages of an adequately rigid central support in combination with a hollow plug can be secured for a two-way valve structure in which the spacing is 180°. This form of valve structure is illustrated in Figs. 2, 2A and 4. In this form, the valve body 1 has inlet and outlet passages 2 and 3, as well as a tapered plug seat 5, the axis of which is transverse to the passages 2 and 3. In this instance the larger end 6 of the seat is open. The upper or smaller end may be provided with a bridge 7, to support the upper end of the plug spindle or post 8. The tapered rotatable member 9 seats in seat 5 to form a fluid tight joint. It also has a transverse passage 10 capable of being alined with inlet 2 and outlet 3 as shown in Fig. 2; or of being placed transverse thereto, as shown in Fig. 2A to close the valve.

In this instance the member 9 is adapted to be rotated as by the aid of lugs 11 formed on the larger end of the plug. To compensate for the vertical component of the force exerted by the line pressure in passages 2 and 3 on the member 9, a compression spring 12 may be confined between the bottom of plug 9 and a head 4 on post 8, urging the plug axially upwardly. The post 8 is not keyed to the plug 9, but acts as a rigid central support for it. The force exerted by spring 12 may be adjusted by nuts 13 engaging the threaded end of the post 8.

Leakage of line fluid from passage 10 around the post 8 is prevented by the aid of a center core 14 of the plug 9, appropriately apertured for the reception of the post 8. The plug wall 16 is spaced from the core 14 to provide the bifurcated passage 10 between the inlet and outlet. The core 14 as before, may be streamlined as by the aid of the narrow wings 17. This serves to reduce turbulence and resistance to flow. To increase the effective area of the passage 10, the top and bottom of the plug interior may be enlarged at the center, as indicated at 18.

The spacing 21 (Fig. 2) indicates the angular displacement of the outlet bore 3 from the inlet 2. It corresponds to 180°. The angle represented by "bore 23" is the angular extent of either the inlet or outlet and corresponds also to the closing lag. The opening lag 24 and the seal 22 are indicated in Fig. 2A. The pitch 20 in this instance corresponds to an angle of 90°, and refers to the required rotation of the plug 9 to open or close the valve.

Both the inlet 2 and outlet 3 must have a bore 23 no greater than 90°, for otherwise the outer 16 of the plug 9 would not be able to seal these bores in the closed position. When the valve is open as indicated in Fig. 2, the plug 9 is expanded by internal line pressure. However, in the closed position of Fig. 2A, the line pressure compresses the plug 9 against the outlet 3. Furthermore, the plug passage 10 is filled with trapped or isolated line fluid.

In the open position of Fig. 2, there is no unbalanced component of the line fluid pressure exerted on plug 9. However, as the valve begins to close, unbalancing immediately takes place in a direction corresponding to the axis of bore 3; this unbalancing increases in proportion to the area of the wall 16 exposed to the line pressure in the inlet 2.

Referring to Fig. 2A, a portion of seat 5 is left exposed in closed position to the line fluid trapped in the plug. This objection is avoided in a 120° type of valve illustrated in Figs. 1, 1A and 3, since in that case the plug walls 33 and 33' completely cover the seat surface in both open and closed positions.

The general problems indicated by the discussion of the valves illustrated in Figs. 1, 1A, 2, 2A, 3 and 4, relating to sealing of the valve in both open and closed positions, and relating to side unbalance are minimized or substantially nullified by the construction illustrated in Figs. 5 to 11 inclusive, 22 and 23. In this form of the invention, the spacing of the bores is 120°; and the bores are shown as having an angular extent of slightly over 60°.

The valve body 45 in this instance has a tapered seat 47 transverse to the inlet opening 50 and the outlet opening 49 (Fig. 6). A third passage 48 is also indicated in Fig. 6, but, as explained hereinafter, it may be closed so that the valve functions as an angle two-way valve. The spacing however, is 120° between the bores.

Figure 5:
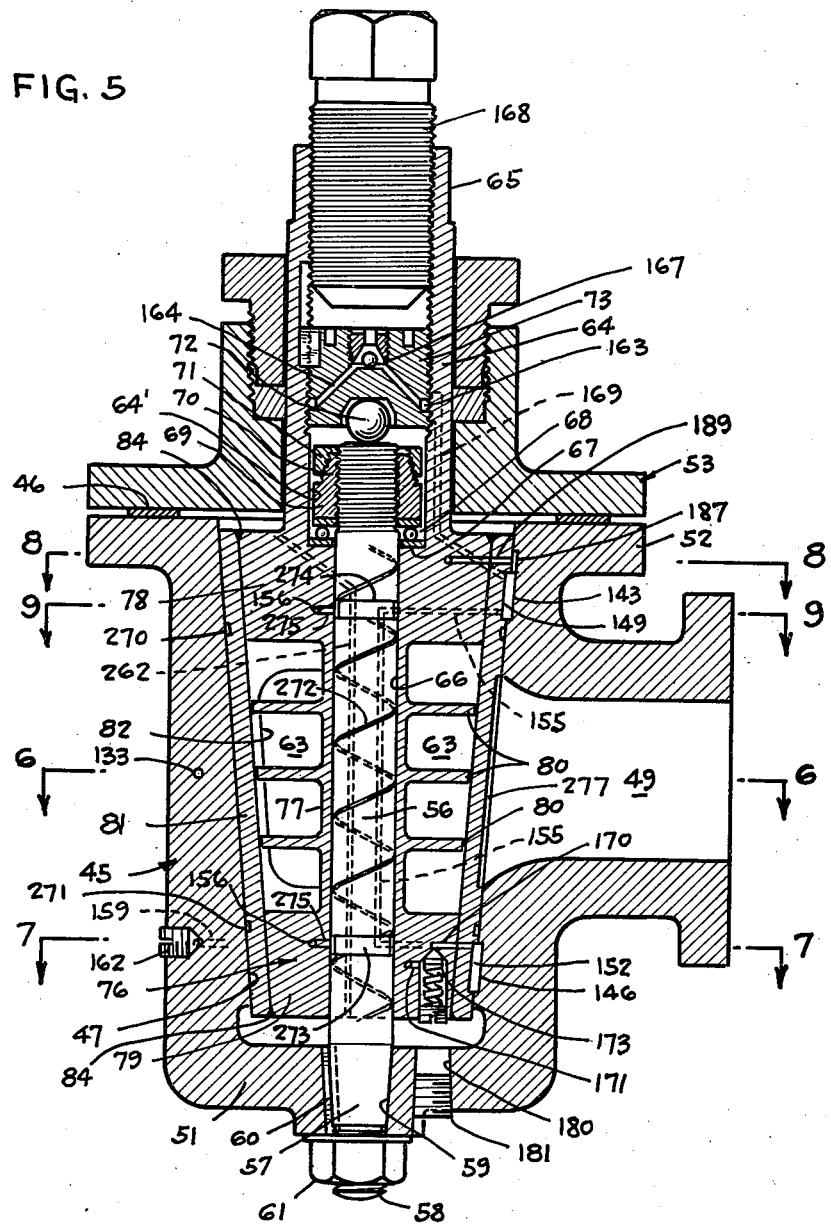
Fig. 5 is a longitudinal sectional view of a valve structure in which some of the features of the invention are incorporated.

The lower or smaller end of the valve body 45 is formed by a wall 51 (Fig. 5). The upper or larger end can be provided with a flange 52. This flange serves to support a bonnet 53 having an opening therein to accommodate the hollow extension 64 of the tapered plug 76. The extension 64 is shown integral with member 76, but it may be made separate, if desired, from the member and of forged material, and fastened to the top flange 78 by any appropriate means, as by bolts. In order to provide a fluid tight construction, a packing 46 can be disposed between the flange 52 and bonnet 53; and packing 54 and gland 55 can be used to render the joint between the extension 64 and the bonnet 53 fluid tight.

In plug valves of this general character, it is preferable to provide a lubricating and sealing material (such as a grease) between the contiguous surfaces of the plug and its seat. However, little or no attention has been paid heretofore to the problem of maintaining the plug truly coaxial in its seat, and thereby ensure that there be uniform clearance between the plug and its seat for the reception of the sealing and lubricating material. It has been common in the past for plugs of this character to develop a minute cocking action, which results in uneven and abnormal wear of the valve, and also in the creation of large forces resisting plug rotation. This cocking or tilting action is apt to be more pronounced with valves controlling fluids at high pressure, and in valves of large size. Hence the necessity, as stated hereinbefore, for invoking the aid of mechanisms capable of exerting large torques upon the valve plug.

In accordance with the present invention, the tendency of the plug to tilt is reduced by the use of a rigid center post such as 56 upon which the plug 76 is rotatably supported. Added to this feature is a fluid pressure system arranged substantially to counterbalance or neutralize any transverse thrust that develops on the plug due to line pressure; in other words, side balance is attained. Side balance plus adequate center support for the plug reduces the tilting tendency to an inappreciable value.

With this end in view, the center post 56 may be held rigidly at its bottom end in the wall 51. Its tapered lower end 57 terminates in a threaded portion 58. The end 57 fits a correspondingly tapered seat 59 in the wall 51, and is urged tightly and firmly into its seat by the aid of the nut 61. In order further to hold the post 56 in fixed position, a key 60 can be interposed between the seat 59 and the tapered portion 57.

The plug structure 76 can be most readily explained in connection with Figs. 5 and 6. The plug body is formed as a spider having end flanges 78 and 79 and intermediate stiffening ribs 80. A central aperture 66 is provided for the reception of the post 56. Appropriately fastened upon this spider is the tapered tubular wall 81, of rather thin material. It has appropriate apertures 82 and 83 capable of being placed in registry with corresponding ports in the valve body 45. The tubular wall 81 can be joined to the spider 78—79—80 as by welding, the welded spots being indicated in general by reference characters 84 and 85. The center core 77 can be made streamlined as heretofore described, to provide the bifurcated passage 63.

The plug 76 with its extension 64 is restrained (in this form of the invention) against axial movement with respect to the post 56. For this purpose the extension 64 is provided with an enlarged aperture 64' forming a shoulder 67 around the top of the aperture 66. Between this shoulder and a nut 69 threaded on the free top end of post 56, there may be interposed a ball thrust bearing structure 68. The nut 69 has a tapered and threaded upper extremity 70 which is split, and which can therefore be compressed around the threads of post 56 as by the aid of the taper nut 71, to lock nut 69 firmly to post 56. The elements 69, 70, and 71 serve to provide a restraint against upward axial movement of the plug structure. To restrain the plug structure against downward axial movement, a ball thrust bearing 72 is shown as engaging the top of post 56. This ball 72 is located in a recess in a threaded member 73 engaging the internal threads of the extension 64. This threaded member can be adjusted axially with respect to the plug 76, as by an appropriate spanner wrench engaging recesses in its top surface. Since the ball 72 rests on top of the post 56, the plug 76 can be moved upwardly against the thrust bearing 68 by turning the threaded member 73 inwardly in the hollow extension 64. It is thus seen that the thrust bearing 68 prevents upward motion of plug 76 and ball 72 prevents downward motion thereof.

It is possible by proper adjustment of the nut 69 and the threaded member 73 to obtain any desired clearance between the plug 76 and the seat 47 in body 45.

Rotation of the plug 76 can be effected by a wrench or the like, engaging the slightly flattened surfaces 65 of the hollow extension 64.

As explained in connection with Figs. 1, 1A and 3, the plug in a valve having 120° spacing is subjected to a side pressure both in open and closed positions, which corresponds in direction to the radius spaced 120° from each of the openings 82, 83 of the plug. In order to substantially neutralize this side pressure when the valve is open, it is necessary, as explained in connection with Fig. 1, to provide a radial force corresponding in direction and magnitude with the unbalanced transverse resultant. This can be readily accomplished in connection with the form of the valve shown in Figs. 5 and 6 by the aid of the closed chamber 48, the pressure in which imparts a neutralizing fluid pressure on the plug wall 81 when the valve is in open position. The resultant pressure in chamber 48 upon the plug is in line, when the plug is in open position with the plug equivalent, and opposed thereto. The creation of this pressure is accomplished by the aid of a duct 133 extending from the inlet pipe 127 to the space 48. The inlet pipe 127 is fastened to the valve body as by the aid of the flange 125. The intermediate gasket 131 is notched as shown at 136 in order to leave the upper end of duct 133 open to the inlet fluid. Similarly, the gasket 132 between the closure plate 75 and the valve body 45 is also provided with a notch 137 to leave the duct end open to the space 48. Accordingly, there is an uninterrupted passage from the inlet 50 to the space 48.

When the valve is closed, as shown in Fig. 6, the side pressure on plug 76 is not neutralized by the pressure existing in space 48, since there is in this position a side thrust alined with the axis of the outlet 49, and chamber 48 is in communication with the interior of the plug. However, when the valve is open, the port 82 is in alinement with outlet 49; and port 83 is in alinement with port 50. The wall 81 covers the space 48 and is subjected to the balancing pressure in space 48, and in this way the plug 76 is balanced.

In Fig. 6, the outlet 49 is shown as connected by the aid of a flange 126 to an outlet pipe 128. An intermediate gasket 130 is provided between flange 126 and the outlet pipe. If it be desired to change the valve so that the passage 48 becomes the outlet instead of passage 49, it is a simple matter to substitute gasket 130 and flange 126 for the gasket 132 and plate 75. In order to provide side balance for the open position even with this change from angular to straight operation, other ducts, such as ducts 134 and 135 can be provided in the valve body 45; and by appropriate change in the angular position of the two respective gaskets, one or the other of these two ducts can be utilized to connect the closed space 49 with that port 48 or 50, which is chosen as the inlet.

Ducts 133, 134 and 135 have been merely diagrammatically illustrated; other ducts hereinafter referred to are also merely diagrammatically shown. The particular manner in which such ducts can be formed in the various parts of the valve structure forms no part of the present invention. Either coring or drilling operations might be utilized, with appropriate end plugs if necessary.

As previously mentioned, Fig. 6 shows the valve in closed position; to open the valve, the plug is turned clockwise as indicated by the arrow through an angle of 120°, bringing opening 82 in registry with body passage 49; and opening 83 in registry with body passage 50. In this position, the pressure of the line fluid tends to unbalance the plug by an amount equal to the inlet pressure acting on an area the size of the plug opening and along a line directed from the center of the plug to the center of body passage 48. This, as before mentioned, is termed the plug equivalent and is neutralized by admitting line pressure to chamber 48 where it can act on the outside of the plug.

Consider now the conditions existing with the plug at some intermediate point (with the valve partly open, however) as shown in Fig. 24. The plug equivalent is still the same in amount and acts along a line intermediate the plug openings, as before, indicated by arrow 278. As this line no longer meets the center of body passage 48, the pressure therein can only partly balance it. The plug is further unbalanced by portions 279 and 280 of its surface which are now subjected to line pressure. To maintain the plug in balance as it is turned between fully opened position and the end of the closing lag, a shallow recess 277 is formed in its exterior surface equal in extent angularly and axially to the body passage (see Figs. 5, 6 and 11). By this means as the plug is turned from full open position the balancing pressure in chamber 48 is effective upon an increasing area of the plug surface. Thus in Fig. 24, pressure in chamber 48 is effective over the entire area of recess 277 and neutralizes the plug equivalent. The pressure also acts on the exposed portion 281 of the plug surface beyond the recess and balances the resultant of the pressure acting on portions 279 and 280 of the plug surface.

When the end of the closing lag is reached, maximum unbalance of the plug occurs, this unbalance decreasing as the plug is turned to fully closed position, (Fig. 6) when it reaches normal value. This side unbalance is substantially neutralized by the aid of appropriate fluid pressures made effective upon the sealing or lubricating compound used with the valve.

For this purpose, the sealing and lubricating grease or compound can be forced under pressure into spaces defined by the aid of the contiguous surface of the plug 76 and body 45. The angular relationship of these areas, as will be hereinafter explained, is such as to make it possible to control the direction of the resultant neutralizing pressures. A reservoir for the lubricating or sealing compound or grease can be formed in the hollow extension 64 above the threaded member 73. The screw 168 can be turned into the extension to exert a pressure of the desired amount upon the liquid or grease accommodated between the member 73 and the bottom of the screw 168. Various passages and ducts, as hereinafter explained, conduct the material from the reservoir in the extension 64 to the desired areas for exerting the desired compensating pressures.

Figure 10:
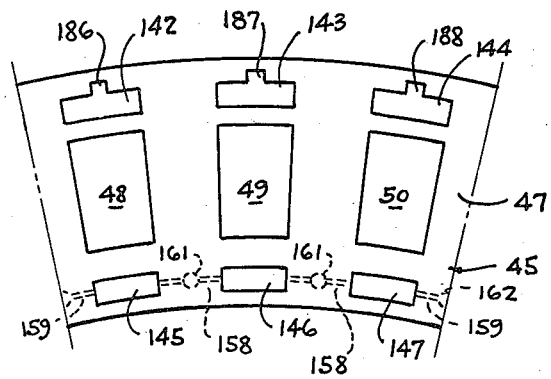
Fig. 10 is a development of the valve body seat surface used in the form of the invention illustrated in Fig. 5, and shows the location of the various ports.
Figure 11:
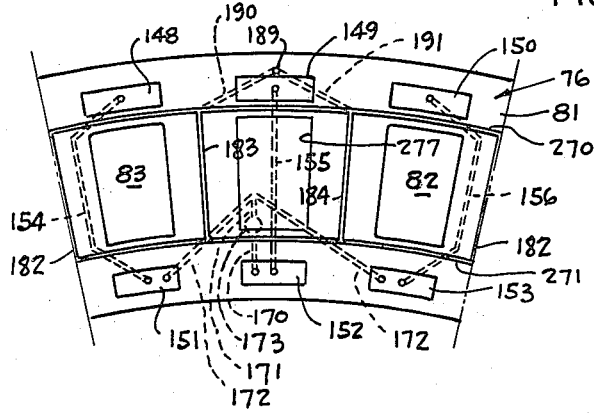
Fig. 11 is a development of the plug surface corresponding to the plug that is adapted to co-operate with the body seat shown in Fig. 10.

In the embodiment of the invention illustrated in Fig. 5 cavities or recesses are shown as formed in both the plug 76 and body 45, to which cavities the sealing compound or liquid can be led under pressure. In Figs. 10 and 11, the cavities or spaces in the body 45 are indicated by reference characters 142 to 147 inclusive; and in the plug 76, by reference characters 148 to 153 inclusive. It is there seen that they are symmetrically arranged in angular relation around the axis of the plug 76. The body cavities 142 to 147 are located above and below the port openings 48, 49 and 50. The corresponding plug cavities 148 to 153 inclusive are shown in Fig. 11 as symmetrical around the axis and of the same angular extent as the cavities 142 to 147. In either open or closed position, the cavities in the body 45 are in alinement with corresponding cavities in the plug 76. In order to balance the pressure on plug 76 in the closed position of Fig. 6, those cavities corresponding in angular position to the direction of the outlet 49 (corresponding to the direction of the plug equivalent) should be supplied with material under sufficient pressure to counteract the unbalanced force. This pressure can be produced prior to the opening of the valve by rotation of the screw 168. The cavities 143 and 146 in the body seat and 149 and 152 in plug 76 are aligned with the outlet of the valve when the valve is in the closed position. This is seen in Figs. 7 and 9.

Cavities 149 and 152 of the plug 76 are in communication with each other by the aid of the duct 155 in the plug. Accordingly in the alined position of Figs. 7 and 9, if fluid pressure is available in either the upper or lower cavities, the same fluid pressure will be available in the other space. Similarly, the other pairs of upper and lower cavities in the plug are connected by plug ducts. Thus cavities 148, 151 are joined by duct 154; and cavities 150, 153 are joined by duct 156.

The fluid pressure from the reservoir is conducted into the upper space formed by the cavities 143 and 149 through a supply duct 169 in plug 76, shown in Fig. 5. This duct leads from cavity 149 upwardly in the wall of the extension 64 and radially to connect with a groove 163 in the threaded member 73. This groove in turn is connected as by passages or ducts 164 to a chamber 167 in which there is a check valve, and an upwardly directed opening into the sealing compound reservoir. Thus as screw 168 is turned downwardly, fluid from the reservoir can flow past the chamber 167 and through ducts 164 into duct 169 and to the plug cavity 149. This communication is maintained for all angular positions of the plug 76, because the groove 163 in threaded member 73 forms a complete ring; and any variation in axial position of member 73 does not affect this connection because duct 169 terminates in a wide axial slot in the face of the extension 64.

Sufficient pressure to balance the side thrust caused by the line pressure is intended to be applied by the aid of screw 168, when it is desired to open the valve. The lubricating and sealing material thus utilized for this purpose is also preferably passed to the other spaces formed 120° from the spaces 143—149 and 146—152; especially for the purpose of providing an adequate greasing and sealing effect in the clearance between the plug 76 and its seat 47. However, the fluid pressure in these spaces should be less than that in the spaces 143—149 and 146—152; for otherwise the unbalanced side pressure produced by the line fluid would not be materially counteracted.

Accordingly, while there are ducts connecting all of the spaces, restraining means or check valves are introduced to prevent passage of the compound into the other spaces until appropriate balancing pressures have been built up in the spaces 143—149 and 146—152.

Fluid pressure, obtained by the aid of screw 168, and existing in spaces 146—152 and 143—149 can be conducted to the other spaces 144—150, 147—153, 142—148 and 145—151 through a passage 170 (Figs. 5, 8 and 11) in communication with space 146—152, past a valve 173 (Fig. 22) into passage 171 in plug 76. This passage 171 branches into passageways 172 (Fig. 7) to extend to the spaces 147—153 and 145—151. Since these spaces are joined by ducts 156 and 154 to the corresponding upper spaces 144—150 and 142—148, it is seen that fluid may enter these upper spaces also, after it passes valve 173.

The valve closure 176 of valve 173 (see Fig. 22) is spring pressed as by the aid of the compression spring 177. In this way the four cavities 144—150, 147—153, 142—148 and 145—151 are supplied with fluid reduced pressure only after the balancing pressures in the other two cavities are reached, because spring 177 restrains the compound against passage by urging closure 176 against the seat 175.

The valve structure 173 is housed in a recess 175 closed by a threaded headless screw 178, which also serves as a guide for the lower end of the spring 177. The threaded headless screw 178 can be adjusted within the threads of the aperture 174 to adjust the force of the spring 177. To facilitate this adjustment, an aperture 180 is provided in wall 151, in alinement with aperture 174, and can be closed when not in use by a threaded plug 181.

The arrangement can be such that by appropriate adjustment of the headless screw 178, the pressure first exerted by the sealing compound is utilized for balancing the side pressure of the plug; and after this side pressure is balanced by the aid of cavities 143—149 and 146—152, the sealing and lubricating compound is permitted to pass valve 173 and to emerge finally in the other four cavities described.

The side thrust due to line pressure is thus balanced by the differences in lubricant pressure existing across the valve 176. This difference can be adjusted to a proper value by means of the headless screw 178, in service, when the valve is closed. For this purpose, the screw 178 is turned until the torque necessary for valve rotation is brought to a minimum value by forcing lubricant by screw 168. The difference of lubricant pressure so adjusted will be adequate for balancing the side thrust throughout the opening lag.

In addition to the ducts 172 in plug 76 joining the two cavities 147—153 and 145—151, additional ducts 159 (Fig. 7) for this purpose in the body 45 can be provided. In this way even when the plug 76 is rotated away from its closed position, so as to destroy registry between the plug cavity 149 and the body cavity 143, the four plug cavities 150, 153, 148 and 151 are left in communication with four body cavities 144, 147, 142 and 145. In addition, since plug cavities 149 and 152 enter into registry with the body cavities 144 and 147 and the plug cavities 148 and 151 enter into registry with body cavities 143 and 146, all of the cavities become connected. In short, all of the cavities are in communication with each other when the plug cavities 149 and 152 pass out of registration with body cavities 143 and 146. In fact this intercommunication of all the cavities 142—153 is established when plug cavities 149—152 (first receiving lubricant), begin to register with the body cavities 142 and 145 which, in the valve shown, takes place at the end of the opening lag. The two connecting ducts 159 can lead to a threaded aperture closed by a headless screw 162. Since, as mentioned before, the passage 48 can be chosen as outlet passage instead of passage 49, provision is made to connect any two sets of body cavities together, instead of merely those just described. For this purpose corresponding ducts 157 and 158 (Fig. 7) can be utilized. These ducts, however, when passage 49 is the outlet, are normally interrupted by the headless screws 161 having tapered ends closely contacting the bottoms of their correspondingly tapered apertures. As shown in Figs. 7 and 9, the cavities 143—149 and 146—152 are isolated from the other cavities and ducts 172 except through the plug ducts 170 and 171 controlled by the spring-pressed valve 173, the screws 161 being tightened to block ducts 157 and 158.

Having created a fluid pressure directed radially inwards along the axis of the outlet passage 49 by the aid of the cavities disposed above and below that outlet passage, the plug 76 can then be turned by application of a wrench to the extension 64. As the plug turns, the cavities 149 and 152 are turned more and more out of registry with the corresponding cavities 143 and 146. The fluid pressure nevertheless continues to compensate for side unbalance, as long as the plug and body cavities overlap. In fact, due to the overlap, the fluid pressure in these cavities is increasingly effective to produce a balancing force due to the increase in effective area of the unalined portions of these stationary cavities. This increasing force serves effectively to counterbalance the unbalanced pressure exerted on the surface of the plug exposed to the inlet port 50. When the cavities 149 and 152 pass completely out of registry with the corresponding body cavities 143 and 146, the fluid in these body cavities need no longer to exercise any force, because for this position the fluid pressure in chamber 48 (Fig. 6) takes care of the unbalance and the valve has now turned through the opening lag.

In the open position, plug cavity 153 is in alinement with body cavity 146; and plug cavity 150 is in alinement with body cavity 143. Fluid pressure can now be exerted in this condition through duct 169, cavity 149—142 and by the aid of the connecting duct 155 to the corresponding lower cavity 145—152. Thence the other four cavities are provided with undiminished pressure; through ducts 159 in the body 45 for cavities 147—151 and 144—148; and through ducts 172 in the plug 76 for cavities 146—151 and 143—148; and all of the six cavities have uniform pressures. The unbalanced plug pressure, as heretofore stated, is compensated by the pressure in chamber 48.

By appropriate interchange of headless screws 161 and 162 and of the gaskets 130, 131 and 132 it is possible to change the valve structure so that either of the passages 48, 49 or 50 forms the outlet.

The lubricating and sealing material flowing into the six cavities serves not only to balance the side thrust but also to spread lubricant over the plug surfaces for sealing.

It is apparent that upon reverse rotation of the plug to close the valve the reverse action takes place, permitting the transverse force acting upon the plug to remain balanced until the valve is fully closed, provided pressure is applied by screw 168 at the end of the closing lag.

It is obvious that the force necessary to balance side thrust can be obtained by unequal lubricant pressure acting on cavities having equal areas, or by equal lubricant pressure acting on cavities of unequal areas. The described form shows merely a preferred method.

It will be observed that by means of screws 161 and 162 all of the lubricant cavities in the body can be intercommunicated to cause equal lubricant pressures therein. This is desirable when the plug is to be turned at a time when there is no line pressure and consequently no unbalanced line pressure force acting on the plug. It is quite apparent that under such conditions an unbalanced lubricant pressure would be detrimental instead of beneficial. Of course, if desired, equal lubricant pressures on all sides of the plug can also be obtained by adjusting the screw 178 to reduce the force exerted by the spring 177 on the valve 175 to zero.

It will be observed that the ducts 157, 158 and 159 provide means for intercommunicating the circumferentially spaced lubricant cavities, which means is quite independent of the intercommunicating system provided by ducts 170 and 171 and valve 173, and either system may be eliminated and certain advantages of the other system still be obtained. Thus the ducts 157, 158 and 159 can be eliminated and the ducts 170 and 171 and valve 173 can still be utilized to induce lubricant into cavities 147—153 and 145—151 at a lesser pressure than the pressure in cavities 146—152 (Fig. 7) to balance the force of the line pressure on the plug when the latter is in closed position; and at the same time effect complete lubrication. The plug can be balanced by introducing lubricant into cavities 146—152 alone, either by eliminating ducts 170 and 171 or by blocking them as by compressing the valve spring 177 sufficiently to keep valve 173 closed at all lubricant pressures employed.

Without employing ducts 170 and 171, but with ducts 157, 158 and 159, one can selectively supply lubricant to cavities 146—152 only, or to all of the cavities, by closing or opening the screws 161.

Since the cavities in moving, spread substantially continuous rings of sealing material above and below the ports, axial leakage of the line fluid past the plug is effectively prevented. However, it is preferable to provide against circumferential leakage between inlet and outlet passages as well. Accordingly, longitudinal passages or cavities or grooves are provided for the plug 76, and are indicated by reference characters 182, 183 and 184 (Fig. 11) intermediate the port plug openings 82 and 83. One form of these cavities is illustrated in Fig. 23. It is there seen that cavity or groove 182 is simply a flat area ground or otherwise formed on the plug surface to a maximum depth of a few thousandths of an inch. The grooves formed in this manner have several advantages in addition to the ease of forming them. The amount of contained lubricant is very small so that when any of the grooves 182, 183 and 184 passes from the seal into the body bore, the lubricant expands but slightly due to the release of pressure in the cavity. Therefore, very little of it is scraped off as the cavity passes the edge of the body port to reenter the seal. Further, the tapered sides of the cavity enable the pressure on the lubricant to produce a wedging action thereon, resulting in a very effective seal. Another advantage of the relatively broad and shallow grooves is that the lubricant pressure acting in the cavities formed thereby facilitates the operation of the valve, since this pressure counteracts the expansion of the plug which might be caused by the line fluid pressure within the plug.

As an additional preventive of axial leakage between the plug and its seat, circumferential sealing grooves 270 and 271 may be formed in the surface of the plug, above and below the passage 63. These extend entirely around the plug and connect the longitudinal grooves 182, 183 and 184. Thus all of the sealing cavities are in continuous communication with each other, when the grooves 270 and 271 are provided.

The sealing grooves are supplied with lubricant from the same reservoir as are the cavities for balancing the plug. Figs. 5, 8, 10 and 11 illustrate how these sealing cavities 182, 183, 184, 270 and 271 may be supplied with a sealing compound under pressure at the same time that this sealing compound is supplied to the balancing cavities. For this purpose, one set of the cavities, for example, 142, 143 and 144, in the body 45 is provided with centrally disposed extensions 186, 187 or 188. A duct 189 (Fig. 8) in plug 76 is in communication with groove 184, by means of a duct 191, and with groove 183 by a duct 190. Duct 189 registers with one of the extensions 186, 187, or 188, whenever the plug passage 83 is in registry with a body passage. As shown with the valve in closed position, it is in registry with extension 187.

Thus in any alined position of the valve passages, all three axial cavities 182, 183 and 184, as well as the circumferential grooves 270 and 271 when such grooves are provided, are in communication with a source of lubricant pressure to keep the valve sealed in a circumferential as well as axial direction. Soon after the plug 76 is rotated in a clockwise direction to open the valve, duct 189 is disconnected from its source of supply; thus before these cavities 182, 183 and 184 can extend across port openings in the body 45, supply of material under pressure is interrupted. The duct 189 does not again aline with a lubricant supply cavity until the plug is in substantially open position. At that time, the lubricant compound is again permitted to flow, and pressure is exerted thereon into the sealing cavities 182, 183, 184, 270 and 271.

It is an important advantage of this mode of controlling the supply of sealing lubricant, that at no time is any sealing groove exposed to a port during the exertion of pressure on the lubricant; accordingly there is no appreciable waste of lubricant by expulsion of it under pressure into the line. This advantage is secured by providing one or more ducts, such as 189 which are in permanent connection with the sealing grooves, but which are in connection with a source of pressure only at specific angular positions.

The lubricant from the balancing grooves may also be used to lubricate the center post 56. A special groove 272 may be formed on its surface meeting annular grooves 273 and 274 near its ends (see Figs. 5, 7, 9). Ducts 275 which branch from port 156 are in line with these annular grooves, and allow lubricant from port 156 to enter the spiral groove 272. As lubricant cannot reach port 156 except after passing valve 173, it will be plain that only low pressure lubricant will be used on post 56, and that the balancing of the valve will not be effected.

In order to prevent any material difference in fluid pressure above and below the plug 76, a duct 262 can be provided in the plug to connect the upper and lower spaces. Furthermore, in order to ensure that the desired approach of the surfaces between the plug 76 and seat 47 will be maintained, the valve parts, particularly the center post 56, plug 76 and body 45 are preferably made from metals having substantially the same coefficient of expansion. It is also seen that the angular width of the body and plug cavities should be commensurate with the corresponding bores in order to make it possible to control the balancing forces in accordance with the plug positions. These relative proportions of cavities to the bores are indicated in Figs. 10 and 11. The resultant center of each pair of cavities is preferably essentially coincident with the center of pressure of the respective port. This allows transverse balancing without tilt of the closing member. This described assembly is particularly adaptable to a slightly tapered or even a cylindrical plug valve.

In the form just described, the spacing between the inlet and outlet ports is less than 180°. In the form shown in Figs. 13 to 18 inclusive, the inlet port 94 and the outlet port 93 in the valve body 91 are diametrically opposite and their center lines pass through the axis of the rotatable plug 106. In this form the valve body 91 has a tapered seat 92 for the accommodation of the rotatable plug 106 therein. As before the plug 106 is mounted for rotation on a stationary center post 98, supported at its lower end by the body structure. The plug 106 is provided with a winged core portion 117, having an aperture 107 for accommodating the center post 98, and forming a bifurcated streamlined passage 116.

The manner in which the center post 98 is supported is most readily explained in connection with Figs. 13 and 18. The post 98 has a threaded extremity 100 which extends downwardly beyond the bottom of the body flange. Furthermore, a key or spline 101 is provided for restraining the center post 98 against rotation. This key operates within a slot formed in the supporting boss 96 of the body 91, as well as in an elongated slot 90 formed in the lower end of center post 98. The threaded extremity 100 is accommodated in a boss 104 formed integrally with a plate 102, maintained in contact with the bottom of the body 91. It is apparent that by rotation of plate 102, the post 98 may be moved axially in either direction, depending upon the direction of rotation. The center post 98 is appropriately provided with a head or enlarged portion 99 operating in a bore 237 formed in the hollow extension 109 of the plug 106. This head 99 can be provided with an intermediate center groove 99' in which packing may, if desired, be disposed.

In order to make it possible to attach the plate 102 in any angular position to the body after it has been rotated to adjust the center post 98 axially, this plate 102 is provided with a series of notches or recesses 103 adjacent its periphery. Through these recesses may pass a number of cap screws 105 engaging threads in the bottom flange of the body 91.

The head 99 of center post 98 does not act directly upon the plug 106. Instead there is interposed a spring washer 111 shown in greater detail in Figs. 19 and 20. This spring washer is accommodated beneath the head 99 and on the shoulder 110 formed at the bottom of the bore 237 and around the center bore 107. Thus by drawing post 98 downwardly, for example, the spring washer 111 is compressed and a greater force is created by the washer 111 to urge the plug 106 into its seat 92.

The spring washer construction involves a ring having a lower flange 112'. This lower flange connects to an interior convex portion 112. The upper flange 114 of the ring 111 is turned downwardly at its outer edges to provide a slight clearance between this downwardly turned end and the bottom flange 112'. In order to provide sufficient resilience for the washer, a series of notches 113 can be cut both in the top and bottom flanges. It is apparent that a compressive force acting on the bottom flange 112' will urge this bottom flange toward the top flange 114; and contact is established between the two flanges before the washer 111 is stressed beyond its elastic limit. Accordingly, a definite limit is imposed upon the degree of upward axial movement that the plug 106 can have. The clearance between the upper and lower flanges of washer 111 is made such as to provide a definite small annular clearance between the plug and its seat when this plug 106 is raised in the manner hereinafter described.

The body 21 is open at its top, the downward pressure exerted by the spring washer 111 serving to keep the plug 106 in leak proof contact with the body. As before, the extension 109 can be provided with a portion 108 having flattened surfaces, for the accommodation of a wrench or the like for turning the plug 106. This extension 109 furthermore accommodates a threaded member 235, which is tightened down upon a seat formed between the bore 237 and the threaded aperture in extension 109.

A consideration of the line pressures shows that in the closed position of Fig. 15, the plug 106 is subjected thereby to a compressive force against the outlet side of the body 91. In order to render it possible to rotate the plug easily for opening the valve, it is clear that there should be a counterbalancing force in a direction from the outlet 93 toward the inlet 94. For this purpose, use can again be made of pressure exerted by a lubricating or sealing material, exerted in cavities formed between the plug 106 and the body 91. In this instance, depressions are preferably formed in the body seat surface only, to provide the pressure cavities. These cavities are located both above and below the port openings. The two cavities 200 and 201 shown in Fig. 14 adjacent the top of the seat 92 and diametrically opposed, have an angular extent such that they leave annular gaps equal to the opening lag between their end and the end of cavities 204 and 205 in the plug, when the valve is fully closed. The two cavities 202 and 203 shown in Figs. 13 and 17, are similarly located adjacent the bottom of the seat 92. Cavities 200 and 202 are joined by duct 212. Cavities 201 and 203 are similarly joined by duct 213. In the closed position shown, a side pressure should be exerted in the cavity 201 as well as in the lower corresponding cavity 203. These two cavities are fed with lubricant compound under pressure from a reservoir 215 in the threaded member 235. Pressure is exerted on the material in this reservoir by turning down the screw 214. Lubricant or sealing compound from this reservoir passes the ball check valve 216 located in member 235 below the reservoir 215 and leading to the transverse duct 217. This transverse duct 217 terminates in the annular passage 217' around the member 235. One duct 219 from that passage leads to a cavity 205 in the plug 106 (Fig. 14) as well as by way of duct 207 in the valve body 91 to a spring pressed check valve 209. This check valve construction is similar to that described in connection with Fig. 22. The spring in this instance is made to be easily opened by fluid pressure, or is simply normally open. After the grease or other lubricating or sealing material passes the valve 209, the duct 211 (Fig. 14), passes the material to the two cavities 201 and 203. Cavity 205 is made of sufficiently large angular extent to maintain the duct passages continuous for passing the sealing material for balancing purposes, during the opening lag period, and irrespective of the direction of rotation of the plug 106.

In order to spread the lubricating material over other parts of the seating surfaces and the plug surfaces, the cavities 200 and 202 are likewise fed with lubricant, via duct 218, cavity 204 in the plug 106, duct 206, past spring pressed valve 208, and ducts 210 and 212 to the cavities 200 and 202. In this instance, however, the valve 208 is appropriately urged to closed position by its spring. Accordingly there is a differential in pressure exerted on opposite sides of the plug 106, to effect the side balance. The pressures exerted in cavities 204 and 205 substantially balance each other at all times and can be left out of consideration. Lubricant can always be forced into cavities 204 and 205, from which it can flow into stationary cavities 200 and 201 as follows: across check valves 208 and 209 during opening lag, and directly the rest of the time.

After the pressure of the sealing compound is thus made effective to balance the plug 106, this plug can be rotated to open the valve. During the period of opening lag, the cavities 204 and 205 stay in register with the body ducts 206 and 207. Continued rotation to fully opened position maintains these cavities out of register, for when the valve is open even slightly, there is no longer any disturbing side unbalance. When the valve is closed from fully opened position, no balancing pressure need be exerted until the valve begins to close; that is, during the closing lag. At this point in the operation, cavities 204 and 205 are in communication with their ports 206 and 207 so as to render the balancing pressure again effective when screw 214 compresses the lubricant.

Since the valve structure is symmetrical, by reversing the relative force exerted by the springs of valve 208 and 209, the inlet 94 and outlet 93 can be interchanged with the same balancing effect as before.

Longitudinal sealing grooves can also be provided to supplement the circumferential seal provided by the cavities 200 to 205 inclusive. These longitudinal sealing grooves 240, 241, 246 and 247 are illustrated to best advantage in Figs. 15, 16 and 21. They are shown as extending in the center of the sealing surfaces when the valve is in closed position. Grooves 240 and 241 are shown as disposed on opposite sides of the outlet 93; and longitudinal grooves 246 and 247 are shown as on opposite sides of the inlet aperture 94. The arrangement is such that lubricant or sealing material is passed under pressure into the grooves only while the grooves are in juxtaposition to a wall in the valve body; and only after side balance is attained. As soon as the grooves pass into inlet or outlet port openings, the supply of lubricant is interrupted to the respective grooves.

This is effected by the aid of diametrically opposite cavities 251 and 252 arranged in the periphery of the center post 98 and near the bottom thereof, in conjunction with ducts formed in the rotatable plug 106. Lubricant under pressure can be passed to these two cavities by the aid of the transverse duct 253 connecting with the axial duct 254 in the center post 98. This axial duct in turn connects to a radial extension 254', in register with a horizontal duct 241 in the bottom of the body 91.

The supply of lubricant to duct 241 is effected through a narrow horizontal bore 224. This bore is placed intermediate the larger bores 223, 223', and valves 230, 231 control the admission of lubricant from one or the other of the bores 223, 223', in cooperation with their valve seats 225 and 226. The valves are joined by a common center rod 232, so that when communication from one bore to intermediate bore 224 is interrupted, communication from the other is established. The ends of the bores 223, 223' are closed by the headless screws 227.

When port 94 is the inlet port, lubricant under pressure is immediately supplied from the reservoir 205, and duct 213 as heretofore stated; thence into duct 229 and into bore 223. This pressure is immediately effective to urge valve 231 to its seat to the position shown in Fig. 18. The valve 230 however is unseated by this pressure. The intermediate bore 224 is thus placed in communication with the bore 223'. Bore 223' is supplied with lubricant through ducts 228, 212 and valve 208. Thus lubricant can pass through the space 223', the intermediate bore 224, ducts 241 and 254' to the axial duct 254 and into the cavities 251 and 252; but only after side balancing has been effected.

If port 93 is the inlet port the result is the same except that in that case the valve 230 will be urged to its seat and will serve to open valve 231 to permit the passage of lubricant through the intermediate passage 224 from the bore 223 to the cavities 251 and 252. Again, the passage of lubricant to these cavities is delayed until after the pressure in the body cavities has established side balance.

This feature is useful as it prevents unnecessary waste of lubricant; furthermore, as will be described later, the lifting of the plug 106 from its seat is delayed because the fluid pressure to create the lifting force is rendered effective through one of the bores 223, 223'.

Figure 21:
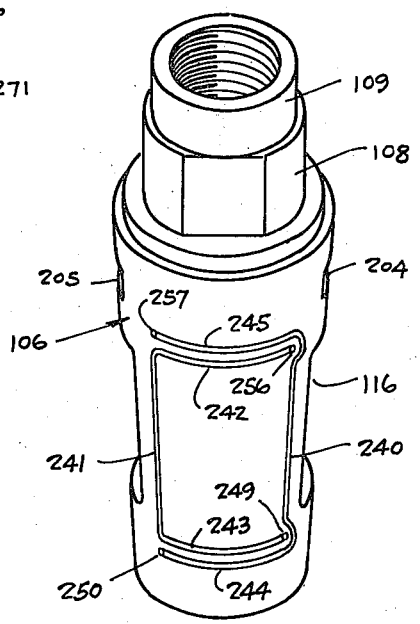
Fig. 21 is a pictorial view of the plug utilized in the form of the invention illustrated in Fig. 13.

Lubricant under pressure from cavities 251 and 252 in the closed position of the valve can pass to the four longitudinal grooves 240—241, 246 and 247 by the aid of the radial ducts 249, 249', 250 and 250' in the plug 106 (Figs. 16 and 21). Radial duct 249 connects cavity 251 with the lower arcuate extension 243 of groove 241. Radial duct 250 connects cavity 251 with the lower arcuate extension 244 of groove 240. Similarly, on the opposite side of the plug 106, radial duct 249' connects cavity 252 with the lower arcuate extension 243' of groove 247; and radial duct 250' connects the cavity 252 with the lower arcuate extension 244' of the groove 246. These lower arcuate extensions 243—244, 243' and 244' are overlapped as shown most clearly in Fig. 21, and form a circumferential and axial seal; thus the port openings are interbracketed by these grooves. If it be assumed that the plug 106 is rotated in a clockwise direction to open the valve, it is seen that ducts 250 and 250' pass out of registry with the supply cavities 251 and 252 shortly after the turning motion is started. Accordingly grooves 240 and 246 are disconnected from their source of lubricant pressure prior to the time when they enter the port openings. However, ducts 249 and 249' remain in communication with cavities 251 and 252; and therefore grooves 241 and 247 are continually supplied with lubricant under pressure. This is proper because these grooves do not in this opening movement become exposed in the port openings.

It is apparent that upon a counterclockwise rotation to open the valve, the supply of lubricant to grooves 241 and 247 is interrupted; and the supply of lubricant to grooves 240 and 246 is maintained.

It is sometimes advisable to create a pressure to unseat the plug 106 slightly before it is rotated. In the form illustrated in Fig. 13, this can be accomplished by the aid of a pair of cavities 258 on opposite sides of the center post 98, similiar to cavities 251 and 252 and adjacent the top of the post. These cavities connect by the aid of radial ducts 256 and 257 (shown most clearly in Fig. 21) with the upper arcuate extensions 242 and 245 of the grooves 241 and 240 respectively. Therefore when lubricant under pressure is passed to grooves 240, 241, 246 and 247, this lubricant can pass to cavities 258 and thence through the transverse duct 259 and the axial duct 260 to a space 238 above the head 99 of the center post 98. This pressure acts on the bottom of the threaded member 235 to urge it upwardly. This upwardly axial motion, however, is limited by the clearance between the flanges of spring washer 111. Also, this upward pressure cannot be secured until after the plug 106 is sidewise balanced, due to the fact that the lifting pressure is obtained from the sealing grooves.

The pressure for raising the plug 106 in this manner is effective thereafter through a range of angular motion, by making cavities 258 substantially coextensive with cavities 251 and 252.

Other modifications for raising the plug 106 can be utilized. In the form shown in Fig. 13A, it is intended that the plug 106 have no sealing grooves. Instead, the bore 224 leads directly to an upright duct 233 extending into the space at the bottom of the plug 106. Accordingly, when pressure is exerted by turning screw 214, lubricant under pressure can pass to bore 223' after side balance is established, by way of the duct 228, and thence to the intermediate bore 224 to the duct 233 to exert an upward pressure.

In the form shown in Fig. 13B, the lubricant pressure is exerted at the top of the head 99 by way of the axial duct 239 connecting with the radial duct 241 supplied from the bore 224 as before. Of course in both of these modifications the upward movement is limited by the free relative movement of the flanges of the spring washer 111. In the form shown in Fig. 13B, the space 238 being quite small, little lubricant is needed to initiate the plug lift.

It may sometimes be advisable to provide lubricant pressure to urge the plug toward its seat instead of away from its seat, and to employ a mechanical lift arrangement when necessary to free the plug from its seat. Such an arrangement can be used in lieu of, or in addition to the spring washer 111 or its equivalent, in order to compensate for the vertical component of the line pressure against the tapered plug surface. This form is shown in Fig. 12. In this embodiment the head 99 of the center post 98 is shown as provided with a seat for the ball thrust bearing 120 which is in contact with a seat in the bottom of the threaded member 121. This member 121 can be provided with a flatted portion 122 for facilitating its operation. By turning the threaded member down in the extension 108, the plug can be raised. The balancing cavities 200, 201, 202 and 203 can be arranged to be supplied with lubricant under pressure as before. The sealing grooves can, as before, be provided with lubricant under pressure through the arcuate extensions 242, 242', 243, 243', 244, 244', 245 and 245' of the sealing grooves. However, these sealing grooves now pass lubricant under pressure to the cavities 258, thence to the cross duct 259 and the axial duct 260, to the transverse duct 261 below the head 99. There the fluid is effective to assist the force exerted by the spring washer 111 to urge the plug 106 toward its seat. The proportions of the valve shown in Fig. 12 are slightly different from those of the valve shown in Fig. 13.

What is claimed is:

1. In a valve structure, a valve body having an inlet and an outlet, a rotatable closure member therein having ports corresponding to the inlet and outlet for optionally opening and closing the valve by appropriate rotation of the said member, said body and said member having, at their contiguous surfaces, a plurality of spaces divisible into two groups symmetric to and respectively adjacent to and in opposition to the body outlet, for the accommodation of a pressure transmitting medium isolated from the fluid controlled by the valve, and means for passing said medium into said spaces, and for controlling the relative pressures of the medium in the respective spaces, whereby the resultant transverse force of the fluid controlled by the valve upon said member is substantially neutralized by the transverse force exerted by said medium.

2. A valve comprising a body member having a line fluid passageway therethrough and a tapered seat formed transversely of the passageway, a tapered closure member engaging said seat and having a line fluid passageway extending therethrough adapted to register with said body passageway in open valve position, a center post coaxial with said seat and extending past the top and bottom walls of said passageway in the closure member, said post being supported by said body member at the end adjacent the small end of said tapered seat against axial movement toward the large end of said seat, and means engaging the other end of the post to the closure member for positively restricting relative axial motion of said closure member with respect to said other end of said post toward the large end of said seat, the engagement between said post and said closure member being located above the top wall of the closure member, whereby the axial forces transmitted from the body through the center post and the closure member to maintain the seating surface of the closure member against the seating surface of the body member places the center post in tension and places in compression that portion of the closure member defining the lateral walls of said passageway therein.

3. In a valve structure, a body member having a tapered seat and a line fluid inlet passage and a line fluid outlet passage intersecting said tapered seat at points spaced substantially 120° apart about the axis of said seat, a tapered closure member engaging said seat and having a passage therethrough adapted to register with both said body passages in open valve position and with the inlet passage in closed valve position, means for applying pressure existing in the inlet passage to the large end of said closure member throughout rotation of the closure member between fully open and fully closed positions, respectively, comprising a port in the closure member connecting the passage therethrough with the larger end thereof, and means defining a chamber at the small end of the closure member in which fluid other than line fluid can be forced to provide a pressure counteracting the line fluid pressure on the large end of the closure member, to facilitate rotation.

4. In a valve structure, a valve body, a rotatable closure member seated therein, a center post upon which said member is guided, said body and member forming a cavity of angular extent varying with movement of the plug where fluid pressure can be exerted to balance the resultant transverse force due to the fluid controlled by the valve, means whereby fluid pressure may be utilized to lift said member from its seat, and means ensuring that substantial side balance is effected prior to the lifting of said member.

5. In a valve structure, a valve body, a rotatable plug seated therein, said body and plug forming a cavity where fluid pressure can be exerted to balance the resultant transverse force due to the fluid controlled by the valve, said cavity including arcuate recesses in both the body and the plug and of such angular extent that during rotation of the plug between limits, the recesses form an annularly extended cavity, and means for supplying a pressure transmitting medium isolated from the fluid controlled by the valve into said cavity.

6. In a valve structure, a valve body having an inlet and an outlet, a rotatable closure member therein to control a line fluid, there being recesses between the body and the closure member for receiving lubricant adapted to exert pressure on said member, said recesses varying in effective area during the rotation of said member to open or close the valve, and means to pass lubricant into said recesses to balance the transverse force of the line fluid upon said member during the opening lag.

7. In a valve structure, a valve body having an inlet and an outlet port, a transversely rotatable closure member having a passage adapted to register with said ports when the valve is open and adapted to remain in communication with the inlet throughout the pitch angle, the radial deformation of said member resulting from pressure therewithin contributing to the seal, and means utilizing lubricant under pressure to cause opposite radial deformation of said member to facilitate its rotation.

8. In a valve structure, a valve body, a tapered valve plug rotatable in said body, said body and plug having cooperating sealing surfaces and the body having line fluid passages communicating with said sealing surface therein and the plug having a fluid passage therethrough adapted to register with said line fluid passages in open valve position, said plug having an axial passage therewithin, a center post extending into said axial passage and secured against axial motion with respect to said body in a direction toward the small end of said plug, and means for applying force between said post and said plug to effect longitudinal jacking movement of the plug.

9. In a tapered plug valve, a body having a seat and having inlet and outlet passages transverse to said seat, a plug member having a port adapted to register with said body inlet and outlet passages when the valve is in open position, said body and plug members having an axial hole to receive a shaft, a shaft in said hole, and means utilizing lubricant under pressure to exert an axial force on said plug member to unseat it, said shaft being closely fitted to said plug at at least two substantially spaced axial points whereby the shaft maintains the plug in alignment with the body when unseated, and means for applying pressure fluid independent of line fluid to said plug in such direction as to balance the radial force exerted by a line fluid on said plug, said shaft preserving alignment of said plug in said body, and said means for applying pressure fluid reducing the disaligning forces applied to said shaft.

10. A valve comprising a valve body, a valve plug rotatable in said body, said body and plug having cooperating sealing surfaces and the body having line fluid passages communicating with said sealing surface therein and the plug having a fluid passage therethrough adapted to register with said line fluid passages in open position of the valve, said plug having a cylindrical passage extending axially therethrough out of communication with said fluid passage therein, a stationary center post fitted in said axial passage and anchored to said body, said plug being rotatable on said center post and having lubricant ducts therein extending from said center post passage, means on said post for defining a stationary port registering with said duct in predetermined position of said plug, and means for supplying lubricant under pressure to said port.

11. A valve structure comprising a valve body, a valve plug rotatable in said body, said body and plug having cooperating sealing surfaces, and the body having line fluid passages communicating with said sealing surface therein, and the plug having a fluid passage therethrough adapted to register with said line fluid passages in open position of said valve, said plug having a longitudinal partition wall rigidly interconnecting the end portions thereof and dividing said fluid passage in the plug into distinct passages, and the circumferential walls of the plug being of substantially uniform thickness, means for lubricating said valve including recesses disposed above and below the line fluid passages, respectively, and duct means within the confines of said partition wall for interconnecting said recesses.

12. In a valve structure, a valve body, a valve plug rotatable in said body, said body and plug having cooperating sealing surfaces and the body having line fluid passages communicating with said sealing surface therein, and the plug having a fluid passage therethrough adapted to register with said line fluid passages in open position of said plug, said plug consisting of a circumferential shell of substantially uniform radial thickness, and a separate inner member of different material joined thereto and constituting, with said shell, the walls of said fluid passage through said plug.

13. In a valve structure, a valve body, and a plug rotatable therein, said body and plug having cooperating sealing surfaces and the body having fluid passages communicating with the sealing surface therein and the plug having a fluid passage therethrough adapted to interconnect the body valve passages in open position of the valve, said body and plug defining at least two circumferentially spaced pressure cavities therebetween symmetrically disposed with respect to said body fluid passages when the valve is in closed position, a source for supplying fluid under pressure, and means for supplying pressure fluid from said source to different circumferentially spaced pressure cavities at predetermined different pressures.

14. In a valve structure, a body member, a rotatable closure member therein, the body member having an inlet and an outlet passage and the closure member having a passage therethrough registering with the body passages in the open position of the valve, one of said members having a pair of separate grooves bracketing a body passage when the valve is in closed position and each groove including an arcuate portion substantially coextensive arcuately with said body passage, which arcuate portion merges into a longitudinal portion at one end, said longitudinal portion being substantially coextensive longitudinally with said body passage, and means for separately supplying lubricant to each of the grooves of said pair of grooves.

15. In a valve structure, a body member having an inlet passage and an outlet passage, a rotatable closure member in said body member to control line fluid flow between said inlet and outlet passages, said body and closure members having cooperating sealing surfaces defining cavities isolated from line fluid, and means for applying a fluid isolated from line fluid to said cavities under pressure, said cavities being so positioned, circumferentially, that the pressure fluid therein exerts a resultant transverse force on the closure member directly opposing the force exerted by the line fluid thereon throughout rotation of said closure member through the opening lag.

16. In a valve structure, a valve body having an inlet passage and an outlet passage, a rotatable closure member therein to control line fluid flow between said inlet and outlet passages, a source for lubricant under pressure, and means for distributing lubricant from said source to the mating surfaces between said body and said member, including pressure-reducing means adapted, in a predetermined position of the member, to build up a resultant transverse lubricant force on said member.

17. In a lubricated plug valve, means to apply lubricant under pressure to two spaced apart portions of the sealing surface of the plug, and means for restraining flow of lubricant to one of said surface portions to reduce the pressure of lubricant at that portion relative to the lubricant pressure at the other portion and produce a predetermined transverse force on said plug.

18. In a valve structure, a valve body and a plug rotatable therein, said body having an inlet and an outlet port unsymmetrically positioned circumferentially about the axis of rotation of the plug and angularly spaced in excess of 90° and less than 180° between their centers, and the plug having a transverse passage therethrough, the ends of which are also unsymmetrically positioned to register with said inlet and outlet ports in open position of said valve, said plug passage being in part defined by two opposite plug walls, one of which is short and the other relatively long measured arcuately about the plug axis, whereby fluid pressure within the plug passage produces a radial component of force in the direction of the said long wall, means defining a recess between the body and plug adjacent the axis of said force at least when said valve is in open position, and means supplying line fluid under inlet pressure to said recess at least in said open position.

19. A lubricated plug valve comprising a body member having inlet and outlet passages and a plug member rotatable therein and having a passage adapted to register with said inlet and outlet passages in open position of the valve, said body and plug members having cooperating sealing surfaces and said plug having a flat segment the maximum depth of which is a few thousandths of an inch and which defines, with said body sealing surface, a lubricant groove, said groove being disposed between said body passages when said valve is in closed position and being exposed to a body passage during movement between open and closed valve positions, and means for supplying lubricant to said groove in closed valve position at a point axially spaced beyond the passage-swept area of the sealing surfaces.

20. A lubricated valve comprising a body member having passageways for line fluid, and a valve seat intermediate said passageways, a valve member rotatable in said seat and having a port adapted to register with said passageways when the valve is in the open position, a lubricant reservoir associated with said valve, means to distribute lubricant from said reservoir to the said seating surfaces of said body and valve members, said means comprising separate lubricant recesses in said body adjacent each of said body passageways, a lubricant duct extending from said reservoir and being adapted to communicate with the recesses adjacent each individual body passageway in the closed position of the valve, and adjustable means for retarding said communication to the recess at a predetermined body passageway.

21. A valve structure comprising a body member having line fluid ports therein and a plug rotatably mounted in said body member having a port therein for interconnecting said body ports in open position of the valve, in which the sealing surface of said body is provided with a plurality of arcuately disposed lubricant areas, including areas adjacent to and symmetrically disposed arcuately with respect to one of said ports therein, and means for supplying lubricant under greater pressure to said symmetrically disposed areas than to other lubricant areas in one position of the valve and under substantially equal pressure to all said lubricant areas in a different position of said valve.

22. In a valve structure, a valve body having an inlet passage and an outlet passage, a rotatable plug in said body to control a line fluid flow between said inlet and outlet passages, said body and plug having cooperating sealing surfaces defining two lubricant cavities, each completely surrounded by the interfitted, mated surfaces of said plug and body and one symmetrically disposed adjacent said outlet passage and the other symmetrically disposed opposite said outlet passage when the valve is in fully closed position, and means when assembled in one relation operable in one position of said plug for applying lubricant under pressure to said two cavities at different pressures to produce a transverse force on the plug, and when assembled in a second relation operable in the same position of the plug for producing an equal lubricant pressure in said two cavities and thereby cancel said transverse force.

23. A lubricated valve comprising a body member having passageways for line fluid and a valve seat intermediate said passageways, a valve member rotatable in said seat and having a port adapted to register with said passageways when the valve is in the open position, a lubricant reservoir associated with said valve, and means to distribute lubricant from said reservoir to said seating surfaces of said valve and body members, said means comprising separate lubricant recesses in said body adjacent each of said body passageways, and a lubricant duct extending from said reservoir and being adapted to communicate individually with the recesses adjacent any individual body passageway in the closed position of the valve, one at a time.

24. A lubricated valve comprising a body member having passageways for line fluid and a valve seat intermediate said passageways, a valve member rotatable in said seat into predetermined positions of full opening and full closure and having a port adapted to register with said passageways when the valve is in open position, a lubricant reservoir associated with said valve, and means to distribute lubricant from said reservoir to said seating surfaces of said plug and body members, including means operable for effecting distribution of lubricant under different pressure to arcuately displaced areas of said seating surfaces in at least one of said predetermined different positions of rotation of said plug.

25. A lubricated valve comprising a body member having passageways for line fluid and a valve seat intermediate said passageways, a valve member rotatable in said seat into predetermined positions of full opening and full closure and having a port adapted to register with said passageways when the valve is in open position, a lubricant reservoir associated with said valve, and means to distribute lubricant from said reservoir to said seating surfaces of said valve and body members, said means comprising separate arcuately displaced lubricant recesses in said body member, and a lubricant duct extending from said reservoir and being adapted to communicate directly with different ones of said body recesses in different ones of said predetermined positions of rotation of said plug member.

26. A lubricated valve comprising a body member having passageways for line fluid and a valve seat intermediate said passageways, a valve member rotatable in said seat and having a port adapted to register with said passageways when the valve is in open position, said valve member having two different positions of rotation in which said valve is closed, a lubricant reservoir associated with said valve, and means to distribute lubricant from said reservoir to said seating surfaces of said valve and body members, said means comprising separate lubricant recesses in said body adjacent each of said body passageways, a lubricant duct extending from said reservoir and being adapted to communicate directly with recesses adjacent only one individual body passageway when said valve member is in one of said two different positions of rotation, and directly with the recesses adjacent only another individual passageway when said valve member is in the other of said two different positions of rotation.

27. A lubricated valve comprising a body member having passageways for line fluid and a valve seat intermediate said passageways, a valve member rotatable in said seat and having a port adapted to register with said passageways when the valve is in open position, a lubricant reservoir associated with said valve, means for applying variable pressure to lubricant in said reservoir and means to distribute lubricant from said reservoir to the said seating surfaces of said body and valve members in response to lubricant pressure in said reservoir, said means comprising separate lubricant recesses in said body adjacent each of said passageways, a lubricant duct extending from said reservoir and being adapted to communicate with the recesses adjacent any individual body passageway in the closed position of the valve, and adjustable means for limiting said communication with the recess at a predetermined body passageway at least for lubricant pressures below a predetermined value.

28. A plug valve comprising a body member having a passageway for fluid therethrough, and a seat transverse to said passageway so positioned that the ports formed at the intersection of the passageway with the seat have their centers angularly spaced more than 90° and less than 180°, a closure member rotatable in said seat and provided with a pair of ports intercommunicated by a passage within said closure member and adapted to register with said two body ports when the valve is in open position, and to remain in communication with one of said body ports when the valve is in closed position, and means for applying pressure fluid other than line fluid, to said closure member to balance the transverse force applied thereto by line fluid therewithin.

29. In a plug valve, a body having a seat and having inlet and outlet passages transverse to said seat, a plug member having a port adapted to register with said body inlet and outlet passages when the valve is in open position, said body and plug member having an axial hole to receive a shaft, a shaft in said hole, and means for supplying lubricant to the seating surfaces of said body and said plug member, including cooperating ducts in said shaft and said plug member, respectively.

30. A lubricated valve comprising: a body member having a seating surface constituting a valve seat, and a plug member having a seating surface rotatably engaging said valve seat; means for introducing lubricant to the said seating surfaces of said body and plug members, including a lubricant recess of limited circumferential extent in the said seating surface of one of said members; a longitudinal groove in the said seating surface of the other member and a duct extending through said other member and connecting with said groove at one end, the other end of said duct terminating in the said seating surface of said other member at a point thereon spaced from said groove and positioned to register with said recess in said one member during movement of said plug member through a predetermined angle.

31. In a lubricated plug valve, a body member having an inlet and an outlet passageway and a plug seat transverse to said passageways, a plug member engaging said seat and having a passage adapted to register with said body passages when the valve is in open position, means for supplying lubricant under pressure to such parts of the said plug in closed position of said valve as to exert a transverse component on said plug member only in one direction away from said outlet passage and means responsive to rotation of said plug into open position for cancelling said transverse component of lubricant pressure.

32. A lubricated plug valve comprising a body member having a valve seat and transverse fluid passageways, a valve member engaging said seat and having a port adapted to register with said passageways when the valve is in open position, means for introducing lubricant between said members including a plurality of grooves and means for supplying lubricant, initially to some of said grooves that are adjacent one of said passageways, until the lubricant pressure therein reaches a predetermined value, and thereafter to all of said grooves.

33. In a lubricated plug valve, a body member having a valve seat and having inlet and outlet passages transverse to said seat, a plug member having a lateral surface rotatably engaging said seat and having a passage therethrough adapted to register with said inlet and outlet passages when the valve is in open position, and means for conveying lubricant serially to two separate areas of the lateral surface of said plug member, said lubricant areas being separated by unrecessed portions of said lateral surface of said plug member, one of said areas being adjacent and symmetrically disposed relative to said outlet passage and the other being symmetrically and oppositely disposed with respect to said outlet passage when the valve is in closed position, said conveying means including a duct extending through said plug member, and means for controllably restricting lubricant flow through said duct for developing a higher lubricant pressure at said first area than at said second area to thereby exert a transverse force on said plug member away from said outlet passage.

34. In a lubricated plug valve, a body member having a valve seat and having inlet and outlet passages transverse to said seat, a valve member engaging said seat and having a port therethrough adapted to register with said passages when the valve is in open position, and means for conveying lubricant serially to areas of the lateral surface of said valve member in separate groups respectively adjacent to and in opposition to said outlet passage when the valve is in closed position, said conveying means including a duct communicating the first mentioned and second mentioned of said groups and operable means for interrupting communication through said duct between said groups.

35. In a lubricated plug valve, a body member having a valve seat and having inlet and outlet passages transverse to said seat, a valve member engaging said seat and having a port therethrough adapted to register with said passages when the valve is in open position, and means for conveying lubricant serially to areas of the lateral surface of said valve member in separate groups respectively adjacent to and in opposition to said outlet passage when the valve is in closed position, said conveying means including a duct communicating the first mentioned and second mentioned of said groups, operable means for interrupting communication through said duct between said groups, and means responsive to a rotation of said valve member for cancelling the effect of said interrupting means.

36. In a tapered plug valve, a body member having inlet and outlet passages and a tapered seat transverse thereto, a plug member in said seat having a passage therethrough adapted to register with said inlet and outlet passages in open valve position, means for exerting transverse force on said plug member in opposition to the transverse force exerted on said plug member by line fluid pressure, and means for lifting said plug member from said seat.

37. In a lubricated plug valve, a body member having inlet and outlet passages and having a seat intercepting said passages, a plug member rotatable in said seat and having a lubricant reservoir therein, lubricant ducts communicating said reservoir with the seating surfaces of said plug and body at a plurality of circumferentially spaced points thereon, and removable plug means within said reservoir confining the flow of lubricant from said reservoir to a duct terminating on the side of the plug which is juxtaposed to the body outlet passage in a closed valve position.

38. In a plug valve, a body member having inlet and outlet passages interrupted by a transverse seat, a plug member rotatable in said seat and having a passageway adapted to register with said body passages when the valve is open, and means for distributing lubricant to the seating surfaces of said body and plug members, said distributing means including two separate lubricant recesses, one adjacent and symmetrical to said inlet passage and the other adjacent and symmetrical to said outlet passage when the valve is in closed position, means for applying lubricant to said two recesses, including means when assembled in one relation operable when the valve is in one position to supply the lubricant to said two recesses at different pressures, said last-named means when assembled in a second relation being operable while the valve is in the same position for applying the pressure of the lubricant in the recess of higher pressure to the lubricant in the recess of lower pressure, whereby the pressures in the two recesses are equalized.

39. In a lubricated valve, a body member having an inlet and an outlet passage and a seat transverse to said passages, a plug member rotatably engaging said seat and having a passage adapted to register with said body passages when the valve is in open position, means for introducing lubricant to the seating surfaces of said members including a plurality of separate arcuate grooves disposed above and below the portion of the seating surface swept by said passages during rotation of the plug member from open to closed position, said arcuate grooves forming arcuately spaced sets of recesses, and means including ducts clear of said seating surface for providing continuous and individual communication between the arcuate grooves forming each of said arcuately spaced sets of recesses.

40. In a lubricated valve, a valve body member having inlet and outlet passageways and a plug seat transverse to said passageways, a plug member rotatably engaging said seat and having a passage therethrough adapted to register with said body passageways when the valve is open, a plurality of arcuately spaced lubricant recesses in the seating surface of at least one of said members, means adapted to supply lubricant to all said recesses under equal pressure when the valve is open, and means responsive to movement of the valve into closed position to condition said supply means to supply lubricant under different pressures to different recesses.

41. In a lubricated valve, a valve body having an inlet and an outlet passage, a transverse closure member in said body to control a line fluid flow between said inlet and outlet passages, means for supplying lubricant between said body and member for sealing about said inlet passage, and means for opposing the transverse pressure components on said closure member due to line fluid and due to said lubricant supplied about said inlet passage, including means for supplying lubricant under greater pressure between said body and member, exerting a transverse pressure component directed to said inlet passage.

WLADIMIR M. ZAIKOWSKY.